United States Patent [19]

Bruer et al.

[11] 3,867,724

[45] Feb. 18, 1975

[54] HEAD DRIVE APPARATUS

[75] Inventors: James Dudley Bruer, Leander; Ronald Eugene Hunt, Austin, both of Tex.

[73] Assignee: International Business Machines Corporation, Armonk, N.Y.

[22] Filed: Dec. 10, 1973

[21] Appl. No.: 423,029

[52] U.S. Cl. .................. 360/97, 274/39 A, 346/137, 360/86

[51] Int. Cl.... G11b 17/02, G11b 3/62, G01d 15/28

[58] Field of Search .......................... 360/86, 97-99, 360/107; 346/137; 274/39 A

[56] References Cited

UNITED STATES PATENTS

| | | | |
|---|---|---|---|
| 2,937,916 | 5/1960 | Hohnecker | 346/137 |
| 3,670,315 | 6/1972 | Fowler | 346/137 |
| 3,706,085 | 12/1972 | Mowrey et al. | 346/137 |
| 3,729,201 | 4/1973 | Dollenmayer | 274/39 A |
| 3,768,815 | 10/1973 | Mathurin | 346/137 |

*Primary Examiner*—Terrell W. Fears
*Assistant Examiner*—Robert S. Tupper
*Attorney, Agent, or Firm*—James H. Barksdale, Jr.

[57] ABSTRACT

An apparatus for driving a magnetic head relative to a rotatable recording medium upon rotation thereof. The apparatus has a turntable for accepting the recording medium; a spindle for aligning the recording medium; a tripod for supporting the turntable; a tubular member for aligning the turntable, spindle, and tripod; and a flange connected to the spindle for causing the spindle to be lowered upon the lowering of the turntable. With a recording medium positioned on the turntable and rotated, a leadscrew connected, through a gear arrangement, to the turntable and the magnetic head will cause the magnetic head to be driven relative to the recording medium. When a new recording medium is to be placed on the turntable, the turntable is lowered; causing the tripod to engage the flange and thereby lower the spindle for facilitating removal of the original recording medium.

6 Claims, 2 Drawing Figures

HEAD DRIVE APPARATUS

CROSS-REFERENCE TO RELATED APPLICATION

U.S. Pat. application Ser. No. 208,800, now U.S. Pat. No. 3,789,160, filed Dec. 20, 1971, entitled "Dictation Apparatus With Disc Loading, Feeding, and Ejecting Feature", having J. D. Bruer et al. as inventors.

U.S. Pat. application Ser. No. 265,841, filed June 23, 1972, entitled "Recording Media Orientation":, having R. E. Hunt et al. as inventors.

BACKGROUND OF THE INVENTION

1. Field of the Invention

This invention relates generally to head driving, and more specifically to an apparatus for driving a magnetic head relative to a recording medium upon rotation thereof.

2. Description of the Prior Art

Representative of the closest known prior published material related to this invention is IBM Technical Disclosure Bulletin Vol. 15, No. 6, November 1972, page 1879. This publication relates primarily to maintaining spindle alignment at the plane of the recording medium. Close tolerances are required to maintain this alignment and there are no means for lowering the turntable and thereby lowering the spindle.

From this publication, it is appreciated that while alignment is maintained, means for lowering the spindle in conjunction with lowering the turntable are absent. Further, it can be appreciated that the required critical tolerances for maintaining alignment are not readily attainable.

SUMMARY OF THE INVENTION

A head drive apparatus is provided for driving a magnetic head relative to a rotatable recording medium upon rotation thereof. The apparatus is primarily made up of a turntable for accepting the recording medium; a spindle for aligning the recording medium, a tripod for supporting the turntable; a tubular member for aligning the turntable, spindle, and tripod; and a flange connected to the spindle for cooperating with the tripod for causing the lowering of the spindle for cooperating with the tripod for causing the lowering of the spindle upon lowering of the turntable. With a recording medium positioned on the turntable and rotated, a leadscrew connected, through a gear arrangement, to the turntable and the magnetic head will cause the magnetic head to be driven relative to the recording medium. When a new recording medium is to be placed on the turntable, the turntable is lowered; causing the tripod to engage the flange and thereby lower the spindle for facilitating the removal of the original recording medium. During the initial lowering of the turntable, the spindle is not lowered. This is to allow for complete withdrawal of the turntable from the recording medium prior to withdrawal of the spindle. The spindle is lowered upon further lowering of the turntable. Alignment is controlled by controlling the clearance between the spindle and an end of the tubular member through which the spindle emerges for engagement with a cap. The tubular member is integral with, or fixedly secured to, a base for maintaining the spindle, the turntable, and the tripod.

DESCRIPTION OF THE PREFERRED EMBODIMENT

Figure 1:
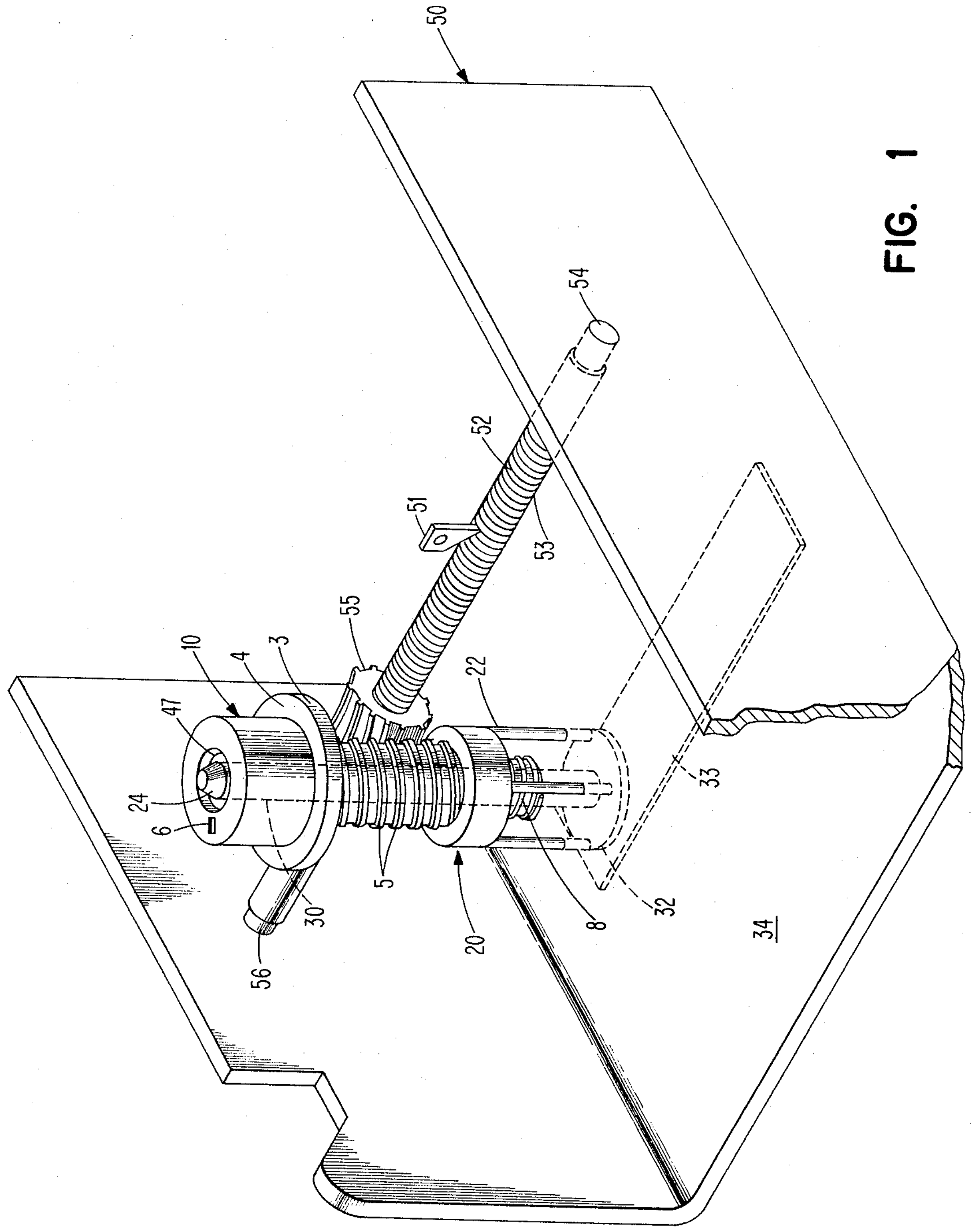
FIG. 1 is a perspective view of a modular unit having incorporated therein the head drive apparatus of this invention.

Referring first to FIG. 1 there is shown a turntable assembly, generally designated by reference numberal 10, housed in a modular unit frame generally designated by reference numeral 50. The primary drive means for the apparatus of this invention can be similar to that disclosed in IBM Technical Disclosure Bulletin Vol. 15, No. 6, November 1972, page 1880. When this drive means is used in conjunction with a pinch roller, a circular recording medium (1 in FIG. 2) can be driven about its outer periphery for in turn driving turntable assembly 10, a leadscrew 53, and a magnetic head (not shown) connected to a shoe 51. More specifically, when a recording medium, as fully described in copending application Ser. No. 265,841, is utilized in conjunction with the above-mentioned drive means and the apparatus of this invention, engagement of the orientation slot in a rotating recording medium with orientation member 6 will effect rotation of turntable assembly 10. The lower portion of turntable assembly 10 has threads 5 which are in direct engagement with gear 55. Gear 55 is fixedly secured to leadscrew 53. Leadscrew 53 is maintained in modular unit frame 50 through its ends 54 and 56 which are journaled in the sides of frame 50. Rotation of turntable assembly 10 will therefore effect rotation of leadscrew 53 and translation of shoe 51 along the threads 52 of leadscrew 53.

Figure 2:
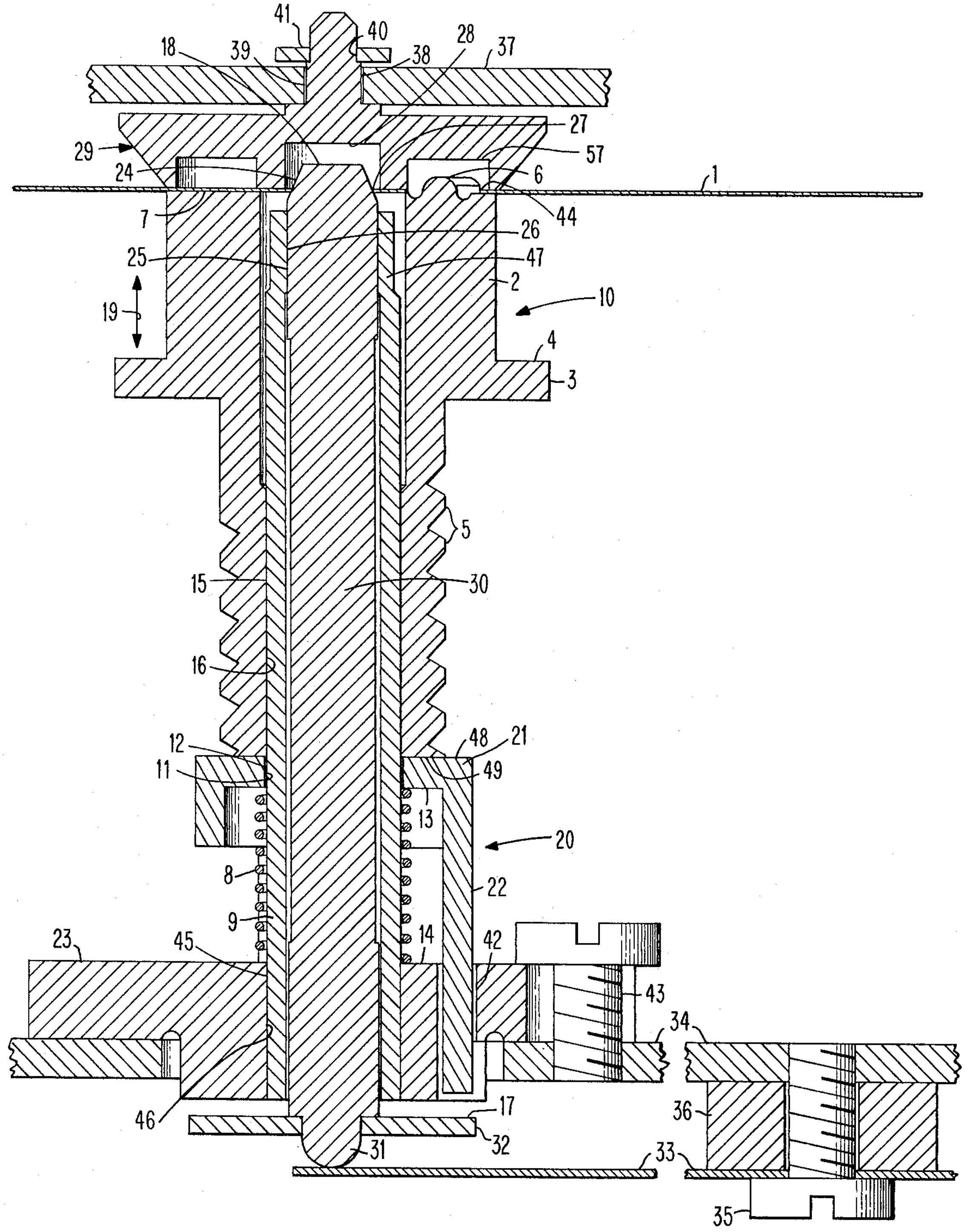
FIG. 2 is a sectional view of part of the head drive apparatus illustrated in FIG. 1.

Referring next to FIG. 2, there is illustrated in more detail part of the apparatus illustrated in FIG. 1. Turntable assembly 10 has rotatable recording medium 1 positioned on the top surface 7 of upper hub 2. As shown, orientation member 6 is in engagement with orientation slot 44 in recording medium 1, and recording medium 1 is properly positioned for causing the driving of a magnetic head relative thereto. Turntable assembly 10 is positionable in an up and down direction, by means indicated by arrows 19, relative to tubular member 9. This means acts against the upper surface 4 of flange 3. The inner surface 15 of the lower portion of turntable assembly 10, in the vicinity of threads 5, is in sliding contact along the outer surface 16 of tubular member 9. As illustrated, turntable assembly 10 has an opening extending therethrough perpendicular to the plane of recording medium 1. Positioned within this opening is tubular member 9 which also extends through an opening in tripod assembly 20 to be described below. Within tubular member 9 is positioned spindle 30, also to be described below. Therefore, spindle 30 and tubular member 9 are positioned and extend as shown within the openings in turntable assembly 10 and tripod assembly 20 with tubular member 9 being positioned between turntable assembly 10 and spindle 10, and tripod assembly 20 and spindle 10.

As illustrated, base 23 is secured to the bottom 34 of modular unit frame 50 by means of screw 43. Tubular member 9 is fixedly secured about end 46 in opening 45 of base 23.

Turntable assembly 10 is urged in an upward direction by means of spring 8 urging a tripod assembly, generally designated by a reference numeral 20, in an upward direction and against the lower portion of turntable assembly 10. An upper surface 48 of top 21 of tripod assembly 20 is in contact with the bottom surface 49 of turntable assembly 10. There is sufficient clearance between points 11 and 12, being the outer surface of tubular member 9 and the opening in tripod assembly 20, for tripod assembly 20 to be freely slidable relative to tubular member 9. Spring 8 acts against the upper surface 14 of base 23 and the lower surface 13 of top 21.

With each of the above-described elements in the position shown, there is no cooperation between the turntable assembly 10 and a spindle 30. Spindle 30 is maintained in this position only by leaf spring 33 acting against end 31 of spindle 30. Leaf spring 33 is secured to bottom 34 by screw 35 and spaced therefrom by means of spacer 36.

Also, with the above-described elements in the position shown, turntable assumbely 10 is urging recording medium 1 against a cap generally designated by reference numeral 29. Cap 29 is freely rotatable about integral shaft 38 in opening 39 in upper frame 37. Further, cap 29 is maintained by frame 37 by means of clamp 41 secured to hub 40. Annular opening 57 and cylindrical opening 28 are for accommodating orientation member 6 and spindle 30, respectively.

When recording medium 1 is to be removed and another recording medium is to be substituted in its place, turntable assembly 10 is translated or lowered by means indicated by arrows 19 acting against the upper surface 4 of flange 3. During the first extent of travel of turntable assembly 10 in a downward direction, tripod assembly 20 is also moved downwardly against spring 8. It is noted that the bottom of a leg 22 of tripod assembly 20 is spaced from upper surface 17 of a flange 32. Leg 22 extends through opening 42 in base 23 and through bottom 34. Flange 32 is fixedly secured to the lower end of spindle 30. Therefore, during the first extent of travel of turntable assembly 10 in a downward direction, spindle 30 is not affected. The clearance between the bottom of leg 22 and the upper surface 17 is sufficient to allow for complete withdrawal of turntable assembly 10 from recording medium 1 before any withdrawal of spindle 30. As turntable assembly 10 is moved further in a downward direction, the bottom of leg 22 will contact the upper surface 17 of flange 32 and urge spindle 30 downwardly against leaf spring 33. This will unseat the upper portion 18 of spindle 30 from recording medium 1. The seating of spindle 30 in recording medium 1 is about a beveled surface 24 in central opening 27.

After a new recording medium has been inserted and positioned with its central opening above spindle 30, turntable assembly 10 and spindle 30 are permitted, by means 19, to move in an upward direction initially under the influence of both springs 8 and 33. In this instance, flange 32 is in contact with leg 22 and upper portion 18 is extending sufficiently above turntable assembly 10 for seating in opening 27 prior to turntable assembly 10 being brought into contact with recording medium 1. Following seating, turntable assembly 10 is permitted to move a further extent in an upward direction for engagement with recording medium 1. This later extent of travel is only under the influence of spring 8.

Initially when turntable assembly 10 comes into contact with recording medium 1, orientation member 6 will be acting against the bottom surface of recording medium 1 unless orientation member 6 is aligned with orientation opening 44. In any event, a phasing operation, wherein recording medium 1 is rotated, will result in orientation opening 44 picking up orientation member 6 for causing rotation of turntable assembly 10.

Alignment of spindle 30 is maintained in the vicinity of the plane of recording medium 1 by means of a crimped portion 47 of tubular member 9. Through swaging, or other suitable means, the tolerances between the enlarged portion 26 of spindle 30 and the inner surface 25 of tubular member 9 can be readily controlled. Therefore, there will be little or no dependence upon cap 29 for maintaining alignment. Further, there will be little dependence on the lower ends of spindle 30 and tubular member 9 for maintaining alignment.

In summary, a head drive apparatus is provided for driving a magnetic head relative to recording medium 1 upon rotation thereof. The apparatus is primarily made up of turntable assembly 10 for accepting recording medium 1; spindle 30 for aligning recording medium 1; tripod assembly 20 for supporting turntable; assembly 10; tubular member 9 for aligning turntable assembly 10, spindle 30, and tripod assembly 20; and flange 32 connected to spindle 30 for cooperating with tripod assembly 20 for causing the lowering of spindle 30 upon lowering of turntable assembly 10. With recording medium 1 positioned on turntable assembly 10 and rotated, leadscrew 53 connected, through gear 55, to turntable assembly 10 and the magnetic head will cause the magnetic head to be driven relative to recording medium 1. When a new recording medium is to be placed on turntable asembly 10, turntable assembly 10 is lowered; causing tripod assembly 20 to engage flange 32 and thereby lower spindle 30 for facilitating the removal of the original recording medium. During the initial lowering of turntable asembly 20, spindle 30 is not lowered. This is to allow for complete withdrawal of turntable assembly 10 from recording medium 1 prior to withdrawal of spindle 30. Spindle 30 is lowered upon further lowering of turntable assembly 10. Alignment is controlled by controlling the clearance between spindle 30 and end 47 of the tubular member through which spindle 30 emerges for engagement with cap 29. Tubular member 9 is integral with, or fixedly secured, to base 23 for maintaining spindle 30, turntable assembly 10, and tripod assembly 20.

While the invention has been particularly shown and described with reference to a particular embodiment, it will be understood by those skilled in the art that various changes in form and detail may be made without departing from the spirit and scope of the invention.

What is claimed is:

1. A recording medium spindle assembly comprising:

a. turntable means for carrying a recording medium and having an opening extending therethrough perpendicular to the plane of said recording medium;

b. spindle means positioned in said opening in said turntable means for aligning said recording medium on said turntable means;

c. support means for supporting said turntable means and biasing said turntable means toward said recording medium, said support means having an opening therein through which said spindle means extends;

d. aligning means positoned in said opening in said turntable means and said opening in said support means between said turntable means and said spindle means, and said support means and said spindle means for aligning said turntable means, said spindle means, and said support means;

e. translation means for causing said turntable means and said support means to be translated away from said recording medium, and permitting said turntable means and said support means to be translated toward said recording medium; and f. means connected to said support means for causing said spindle means to be translated away from said recording medium after said turntable means, and permitting said spindle means to be translated toward and contact said recording medium before said turntable means.

2. An apparatus according to claim 1 including a cap means for maintaining said recording medium in contact with said turntable means.

3. An apparatus according to claim 2 including means connected to said turntable means for engagement by said translation means for translating said turntable means.

4. An apparatus according to claim 3 including a biasing means for biasing said spindle means toward said recording medium.

5. An apparatus according to claim 4 including a base means for supporting said aligning means.

6. An apparatus according to claim 5 including flange means connected to said spindle means for engagement by said means connected to said support means.

* * * * *